United States Patent
Bisinger et al.

(10) Patent No.: US 8,733,821 B2
(45) Date of Patent: May 27, 2014

(54) TRIM ARRANGEMENT FOR A PIVOT ARM OF A MOTOR VEHICLE DOOR

(75) Inventors: Jochen Bisinger, Esslingen (DE); Rainer Kristl, Wernau (DE); Michael Krehmke, Plettenberg (DE); Ralf Rottmann, Drolshagen (DE)

(73) Assignee: DURA Automotive Body & Glass System GmbH, Plettenberg (DE)

( * ) Notice: Subject to any disclaimer, the term of this patent is extended or adjusted under 35 U.S.C. 154(b) by 0 days.

(21) Appl. No.: 13/501,883

(22) PCT Filed: Oct. 13, 2010

(86) PCT No.: PCT/EP2010/006269
§ 371 (c)(1),
(2), (4) Date: Jun. 27, 2012

(87) PCT Pub. No.: WO2011/045052
PCT Pub. Date: Apr. 21, 2011

(65) Prior Publication Data
US 2012/0280532 A1    Nov. 8, 2012

(30) Foreign Application Priority Data

Oct. 14, 2009    (DE) .......................... 10 2009 050 064

(51) Int. Cl.
*B60R 13/02*    (2006.01)

(52) U.S. Cl.
USPC ...................................... 296/146.7; 296/155

(58) Field of Classification Search
USPC ................... 296/155, 146.12, 146.11, 190.11;
49/211, 360, 209, 218–220, 223
See application file for complete search history.

(56) References Cited

U.S. PATENT DOCUMENTS

| 4,268,996 | A | * | 5/1981 | Allen | 49/212 |
| 6,183,039 | B1 | * | 2/2001 | Kohut et al. | 296/155 |
| 7,168,753 | B1 | * | 1/2007 | Faubert et al. | 296/146.12 |
| 7,393,044 | B2 | * | 7/2008 | Enomoto | 296/155 |
| 2006/0267375 | A1 | | 11/2006 | Enomoto | |
| 2009/0000200 | A1 | * | 1/2009 | Heuel et al. | 49/209 |

FOREIGN PATENT DOCUMENTS

| DE | 102007035230 | 1/2009 |
| EP | 2088021 | 8/2009 |
| GB | 2441333 | 3/2008 |

* cited by examiner

*Primary Examiner* — Glenn Dayoan
*Assistant Examiner* — Sunsurraye Westbrook
(74) *Attorney, Agent, or Firm* — Dilworth & Barrese LLP

(57) ABSTRACT

The invention relates to a trim arrangement (10) for a pivot arm (12) of a motor vehicle door (14), in particular of a pivot and slide door (14), which can be moved out between a closed position covering a door opening and an open position releasing the door opening by means of the pivot arm (12) supported at the motor vehicle body (16), on the one hand, and at the motor vehicle door (14), on the other hand, wherein at least one trim element (18) is provided by means of which the pivot arm (12) can be covered at least partly on a side (20) facing the door opening, and wherein the trim element (18) can be moved relative to the pivot arm (12) between the closed position and the open position on the movement of the motor vehicle door (14).

20 Claims, 1 Drawing Sheet

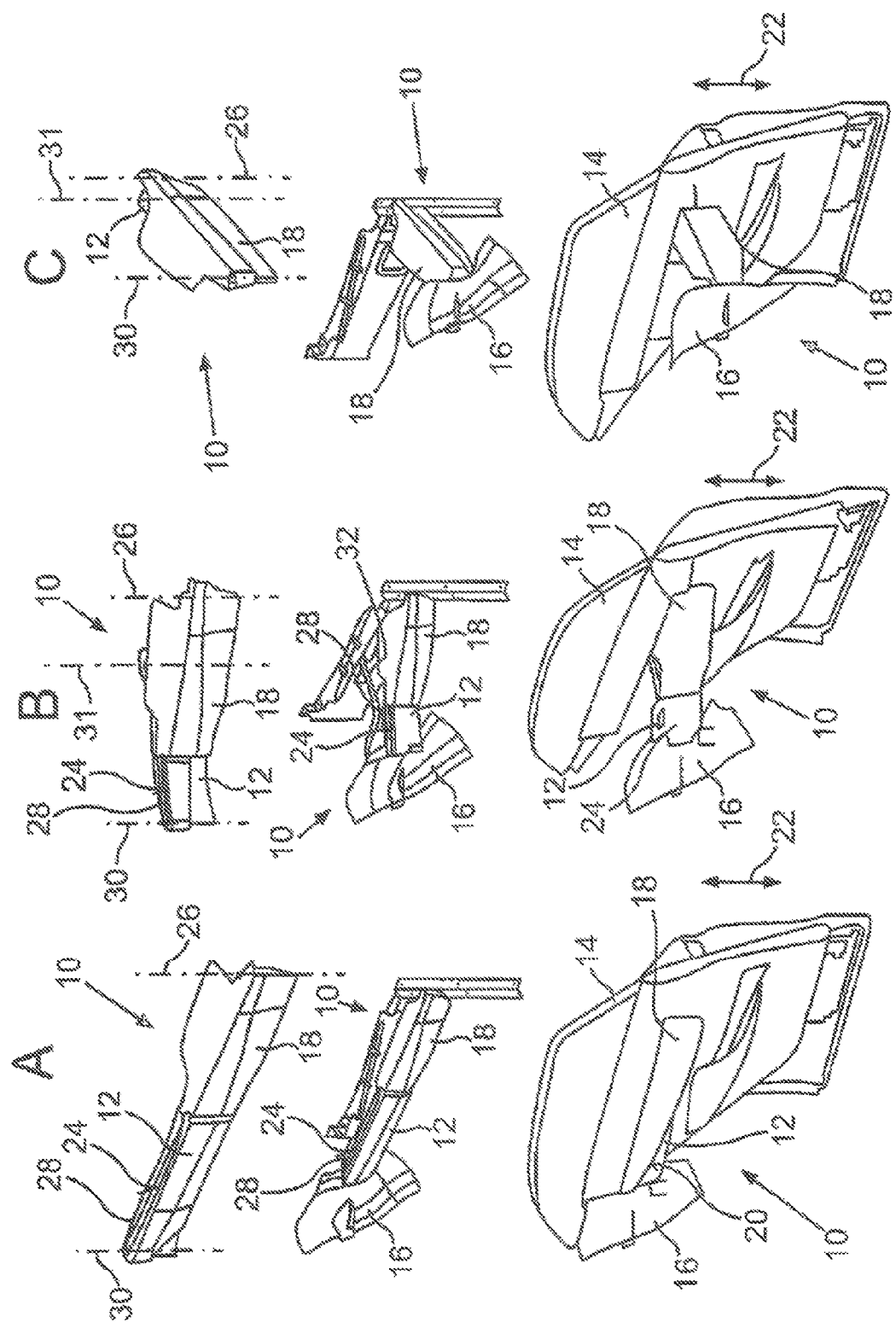

TRIM ARRANGEMENT FOR A PIVOT ARM OF A MOTOR VEHICLE DOOR

BACKGROUND OF THE INVENTION

The invention relates to a trim arrangement for a pivot arm of a motor vehicle door, in particular of a pivot and slide door.

Pivot and slide doors for omnibuses are generally known which can be moved out of a position covering the door opening into an open position releasing the door opening by means of a pivot arm. With this pivot and slide door, a displacement of the door moreover takes place along a side wall of the omnibus for the complete release of the door opening. Recently, such pivot and slide doors are also frequently being used in passenger cars since large door openings can hereby be created without an excessive space being necessary on the opening—in contrast to usual pivot doors—for moving the door.

Said pivot arm is in this respect visually perceivable by the passengers both in the closed and in the open position as well as also on the moving of the pivot and slide door. Since, in addition to the pivot arm, corresponding support points as well as additional kinematic components can also be provided, this results in an impairment of the visual impression of the inner space for the passengers, which is in particular extremely negative in a use in passenger cars or in omnibuses with a very high comfort level.

SUMMARY OF THE INVENTION

It is therefore the object of the present invention to provide a trim arrangement for such a pivot art which communicates a very good visual impression.

This object is achieved by a trim arrangement in accordance with the description herein. Advantageous embodiments with expedient and non-trivial further developments of the invention are set forth in the dependent claims. To provide a trim arrangement having a very good visual impression for such a pivot arm, which is supported at the motor vehicle body, on the one hand, and at the motor vehicle door, on the other hand, and which can be moved out between a closed position covering a door opening and an open position releasing the door opening, this trim arrangement includes at least one trim element by means of which the pivot art can be at least partly covered on a side facing the door opening, with the trim element being movable relative to the pivot arm on the moving of the motor vehicle door between the closed position and the open position.

The trim arrangement in accordance with the invention thus allows the covering of the pivot arm both in the closed position of the motor vehicle door and in its open position as well as on its movement between these two positions since the trim element can be moved via a corresponding coupling to the pivot arm. It can in particular be achieved in this respect that support points as well as additional kinematic components of the pivot arm are also covered in all movement positions. It can moreover be achieved that a change of the relative spacing between the motor vehicle body and the motor vehicle door is hidden in a simple manner by the movement of the trim element relative to the pivot arm.

The covering of the pivot art and of its support points and kinematic components moreover improves the visual impression of the motor vehicle door in that the trim arrangement can be formally integrated into an adjacent trim of the motor vehicle door. This means that only a slight shoulder and/or a slight dividing joint has to be present between the trim of the door and the trim element which cannot be perceived or can hardly be perceived by an observer. The trim element can in this respect be better integrated into the overall visual impression of the motor vehicle door by a corresponding adaptation to the trim of the door.

The trim element can, for example, be a single-part component or a multipart component which covers the pivot arm in the described manner in order thus to improve the visual impression of the motor vehicle door and the total visual impression of an interior design of the motor vehicle.

To realize the relative movement between the pivot arm and the trim element, the trim element is, for example, held pivotably about a pivot axis at the side of the motor vehicle door, on the one hand, with the pivot axis at the door side being arranged at a spacing from the pivot axis of the pivot arm at the door side. On the other hand, the trim element is held pivotably along a guide track of the pivot arm which is formed as a groove-like recess. On the movement of the motor vehicle door between the closed position and the open position, the trim element consequently pivots about its pivot axis at the door side, whereas it slides, guided by the guide link, along the pivot arm, on the other hand, and thus preferably covers it during the total movement of the door.

For the further advantageous influencing of the visual impression, provision is, for example, made that the trim element also covers the pivot arm on a side facing upward in the vertical direction of the motor vehicle door and on a side facing downward in the vertical direction of the motor vehicle. This cover furthermore provides a protection against lubricant for lubricating corresponding support points of the pivot arm or of the trim element respectively.

BRIEF DESCRIPTION OF THE DRAWING

Further advantages, features and details of the invention result from the following description of a preferred embodiment as well as with reference to the drawing. The features and feature combinations shown above in the description as well as the features and feature combinations shown in the following in the description of the FIGURE and/or in the FIGURE alone cannot only be used in the respective combination given, but also in other combinations or alone without departing from the framework of the invention. In this respect, the FIGURE shows, sectionally, nine perspective views of a trim arrangement for a pivot arm of a pivot and slide door which can be moved out between a closed position covering the door opening and an open position releasing the door opening by means of a pivot arm, with a trim element covering a side facing the door opening as well as a side of the pivot arm facing upwardly in the vertical direction of the door.

DESCRIPTION OF THE PREFERRED EMBODIMENT

The FIGURE shows a trim arrangement 10 for a pivot arm 12 of a pivot and slide door 14 of a motor vehicle which can be moved out between a closed position covering a door opening and an open position releasing the door opening by means of the pivot arm 12 supported at the motor vehicle body 16, on the one hand, and at the motor vehicle door 14, on the other hand. In the present embodiment, the trim arrangement 10 for the pivot arm 12 or for the pivot and slide door 14 is associated with a microbus or the like.

However, it must also be considered as covered within the framework of the invention that the present trim arrangement 10 for the pivot arm 12 or for the pivot and slide door 14 respectively can also be used in passenger cars, in other transporters or other motor vehicles. The present pivot and slide door 14 in this respect serves in the present embodiment for closing a door opening in the region of a side wall of the motor vehicle, and indeed in particular as a rear side door. In principle, the pivot and slide door 14 could, however, also be positioned at another point.

This movement from the closed position into the open position is shown in this respect in the FIGURE column-wise by columns A, B and C, with the pivot and slide door 14 in accordance with column A being in its closed position and in accordance with column C being in its open position. In accordance with column B, the motor vehicle door 14 is in an intermediate position.

As can be seen from the FIGURE, the pivot arm 12 is pivotably supported about a pivot axis 30 at the motor vehicle body 16 and about a pivot axis 31 at the pivot and slide door 14. In addition, a further arm 32 is provided which can be recognized in the two lower representations of column B. This arm 32 is likewise supported at the motor vehicle body 16, on the one hand, and at the pivot and slide door 14, on the other hand. It forms, together with the pivot arm 12, a parallelogram-like mechanism by which the pivot and slide door 14 is, on the one hand, outwardly moved out and rearwardly displaced or transposed on opening and is, on the other hand, forwardly displaced or transposed and inwardly moved in on closing.

It is clear that instead of the parallelogram-like mechanism, a different pivot and slide mechanism could also be used or a different moving-out mechanism could be used overall.

The trim arrangement 10 now includes a trim element 18 by means of which the pivot arm 12 can be covered both on a side 20 facing the door opening and on an upwardly facing side 24, in accordance with a direction arrow 22, in the vertical direction of the pivot and slide door 14. The trim element 18 is in this respect movable relative to the pivot arm 12 between the closed position and the open position on the movement of the pivot and slide door 14.

This movability is realized in that the trim element 18 is held pivotably about a pivot axis 26 on the side of the pivot and slide door 14. On the other hand, the trim element 18 is held displaceably along a guide track 28 of the pivot arm 12. The guide track 28 is formed as a groove-like recess in the pivot arm 12. The guidance of the trim element 18 in the guide track 28 is formed such that the trim element 18 has a guide spigot which cannot be recognized in any more detail, which is connected to the trim element 18 and into which the guide track 28 engages.

As can be seen, the trim element 18 is pivoted about its door side pivot axis 26, on the one hand, by the described forced coupling with the motor vehicle door 14 and the pivot arm 12 and, on the other hand, slides, guided by the guide track 28, along the pivot arm 12. The pivot axis 26 of the trim element 18 at the door side is in this respect arranged at a spacing from the pivot axis 31 of the pivot arm 12 at the door side. This can in particular be recognized from the above representations of the columns B and C. No separate drive apparatus is thus required for the trim element 18. It is rather driven by the kinematics for moving the door as a consequence of the forced coupling.

In particular the lowest line of the columns A, B and C illustrates the formal integration of the trim element 18 into a further trim of the motor vehicle door 14, which improves a visual impression of the motor vehicle door 14 and thus a total interior of the motor vehicle.

It can furthermore in particular be recognized from the lowest representation of column C that the trim element 18 is at least substantially adapted to the spacing between the pivot and slide door 14 in its open position and the pivot axis 30 of the pivot arm 12 at the motor vehicle body 16.

The pivot arm 12 can moreover be provided at the side of its pivot axis 30 itself with a fixed trim which is composed, for example, of an identical or similar material to the trim element 18.

The trim element 18 in the present case is made angular or of U shape in cross-section and is substantially manufactured from plastic. In the region of the guide spigot cooperating with the guide track 28 or in the region of the support points of the pivot axis 26, corresponding reinforcements can be provided in this respect.

The invention claimed is:

1. A trim arrangement (10) for a pivot arm (12) of a motor vehicle door (14), in particular of a pivot and slide door (14), which is movable out between a closed position covering a door opening and an open position releasing the door opening by the pivot arm (12) pivotally supported on the motor vehicle body (16), at one end, and pivotally supported on the motor vehicle door (14), at another end, wherein at least one trim element (18) is provided by which the pivot arm (12) is covered at least partly on a side (20) facing the door opening, and the trim element (18) is moved relative to the pivot arm (12) between the closed position and the open position on the movement of the motor vehicle door (14), wherein the trim element (18) is held pivotably about a pivot axis (26) at one end on the side of the motor vehicle door (14), and wherein the trim element (18) is linearly slidable along a length of the pivot arm (12).

2. A trim arrangement (10) in accordance with claim 1, wherein the pivot axis (26) of the trim element (18) at the door side is arranged at a spacing from a pivot axis (31) of the pivot arm (12) at the door side.

3. A trim arrangement (10) in accordance with claim 2, wherein the trim element (18) is, on the other hand, held displaceably at the pivot arm (12).

4. A trim arrangement (10) in accordance with claim 3, wherein the trim element (12) is held displaceably along a guide track (28) of the pivot arm (12).

5. A trim arrangement (10) in accordance with claim 4, wherein the guide track (28) is designed as a groove-like recess in the pivot arm (12).

6. A motor vehicle door (14), in particular a pivot and slide door (14), comprising a trim arrangement (10) for a pivot arm (12) of the motor vehicle door (14) in accordance with claim 5.

7. A motor vehicle door (14), in particular a pivot and slide door (14), comprising a trim arrangement (10) for a pivot arm (12) of the motor vehicle door (14) in accordance with claim 2.

8. A trim arrangement (10) in accordance with claim 1, wherein the trim element (18) is, on the other hand, held displaceably at the pivot arm (12).

9. A trim arrangement (10) in accordance with claim 8, wherein the trim element (12) is held displaceably along a guide track (28) of the pivot arm (12).

10. A motor vehicle door (14), in particular a pivot and slide door (14), comprising a trim arrangement (10) for a pivot arm (12) of the motor vehicle door (14) in accordance with claim 8.

11. A trim arrangement (10) in accordance with claim 9, wherein the guide track (28) is designed as a groove-like recess in the pivot arm (12).

12. A motor vehicle door (14), in particular a pivot and slide door (14), comprising a trim arrangement (10) for a pivot arm (12) of the motor vehicle door (14) in accordance with claim 9.

13. A motor vehicle door (14), in particular a pivot and slide door (14), comprising a trim arrangement (10) for a pivot arm (12) of the motor vehicle door (14) in accordance with claim 11.

14. A motor vehicle door (14), in particular a pivot and slide door (14), comprising a trim arrangement (10) for a pivot arm (12) of the motor vehicle door (14) in accordance with claim 1.

15. A trim arrangement (10) in accordance with claim 1, wherein the trim element (18) is, on the other hand, held displaceably at the pivot arm (12).

16. A trim arrangement (10) in accordance with claim 15, wherein the trim element (12) is held displaceably along a guide track (28) of the pivot arm (12).

17. A trim arrangement (10) in accordance with claim 16, wherein the guide track (28) is designed as a groove-like recess in the pivot arm (12).

18. A motor vehicle door (14), in particular a pivot and slide door (14), comprising a trim arrangement (10) for a pivot arm (12) of the motor vehicle door (14) in accordance with claim 17.

19. A motor vehicle door (14), in particular a pivot and slide door (14), comprising a trim arrangement (10) for a pivot arm (12) of the motor vehicle door (14) in accordance with claim 1.

20. The trim arrangement of claim 1 wherein the trim arrangement (18) is movable with respect to the motor vehicle body (16) as well as the motor vehicle door (14) and the pivot arm (12) upon the opening and/or closing of the motor vehicle door (14).

* * * * *